United States Patent [19]
Jellum et al.

[11] Patent Number: 5,712,645
[45] Date of Patent: Jan. 27, 1998

[54] ANTENNA ADAPTED FOR PLACEMENT IN THE WINDOW OF A VEHICLE

[75] Inventors: Gregory M. Jellum, Stillwater; Bradley L. Givot, St. Paul, both of Minn.; Roger A. Brekken, Farmington Hills, Mich.; Susan N. Bohlke, Woodbury, Minn.

[73] Assignee: Minnesota Mining and Manufacturing Company, St. Paul, Minn.

[21] Appl. No.: 540,299

[22] Filed: Oct. 6, 1995

[51] Int. Cl.⁶ .................................................. H01Q 1/32
[52] U.S. Cl. .......................................... 343/713; 343/711
[58] Field of Search ........................... 343/713, 711, 343/715, 712, 795; H01Q 1/32

[56] References Cited

U.S. PATENT DOCUMENTS

| | | | |
|---|---|---|---|
| 2,923,813 | 2/1960 | Davis | 250/20 |
| 3,208,070 | 9/1965 | Boicey | 343/712 |
| 3,473,863 | 10/1969 | Lewis | 350/160 |
| 3,599,214 | 8/1971 | Altmayer | 343/713 |
| 3,615,986 | 10/1971 | Dickason et al. | 156/105 |
| 3,638,225 | 1/1972 | Zawodniak | 343/713 |
| 3,766,563 | 10/1973 | Sauer et al. | 343/713 |
| 3,775,274 | 11/1973 | Rust et al. | 204/146 |
| 3,810,184 | 5/1974 | Boicey et al. | 343/713 |
| 3,816,837 | 6/1974 | Smith | 343/713 |
| 3,818,489 | 6/1974 | Bobel, II et al. | 343/713 |
| 3,866,232 | 2/1975 | Weight | 343/713 |
| 3,893,234 | 7/1975 | Levin | 29/628 |
| 3,910,809 | 10/1975 | Fern et al. | 156/433 |
| 3,964,068 | 6/1976 | Torii et al. | 343/704 |
| 3,971,029 | 7/1976 | Torii et al. | 343/704 |
| 3,987,449 | 10/1976 | DeAngelis et al. | 343/713 |
| 4,072,953 | 2/1978 | Comastri et al. | 343/713 |
| 4,086,594 | 4/1978 | Kropielnicki et al. | 343/704 |
| 4,086,595 | 4/1978 | Cherenko | 343/713 |
| 4,251,316 | 2/1981 | Smallbone | 156/634 |
| 4,260,989 | 4/1981 | Ishii et al. | 343/704 |
| 4,703,328 | 10/1987 | Jones et al. | 343/704 |
| 4,757,322 | 7/1988 | Yokogawa et al. | 343/712 |
| 4,768,037 | 8/1988 | Inaba et al. | 343/712 |
| 4,791,426 | 12/1988 | Lindenmeier et al. | 343/713 |
| 4,803,492 | 2/1989 | Inaba et al. | 343/713 |
| 4,822,451 | 4/1989 | Ouderkirk et al. | 156/643 |
| 4,849,766 | 7/1989 | Inaba et al. | 343/713 |

(List continued on next page.)

FOREIGN PATENT DOCUMENTS

| | | | |
|---|---|---|---|
| 1358483 | 7/1974 | United Kingdom | 343/713 |

OTHER PUBLICATIONS

"A New Generation of Antennas for Automobile Use", General Motors Research Laboratories, Louis L. Nagy, No. 870092, pp. 17–28.
"What's Coming in '95 and Beyond", New Cars & Trucks, BusinessWeek, Reprinted from Nov. 7, 1994 Issue.
"Antenna under glass to return in '96", WARD's Auto World, p. 43, Sep. 1994.
"Supplier Predicts 8M Navigation Market", Automotive Industries, p. 36, May 1995.
"Advances in Concealed AM/FM Antenna System Design", SAE Technical Paper Series No. 930952, pp. 1–14.
Antenna Patterns, TENNAVIT® Antenna Windshield, Product Information No. 5.
"Land Mobile Antenna Systems III: Cars, Trains, Buses", Mobile Antenna Systems Handbook, Lindenmeier, 1994.

Primary Examiner—Hoanganh T. Le
Attorney, Agent, or Firm—Gary L. Griswold; Walter N. Kirn; Harold C. Knecht, III

[57] ABSTRACT

An antenna adapted for placement in the window of a vehicle includes a flexible substrate having a pair of opposing surfaces, at least one of which is provided with electrically conductive metal traces in the form of a pattern configured to receive and transmit one or more electromagnetic signals. The pitch, trace width, and thickness of the metal traces are selected such that the antenna has an area-averaged resistivity of no greater than about 1 ohm/square for a pre-determined area-averaged transmission value in the visible region.

17 Claims, 1 Drawing Sheet

U.S. PATENT DOCUMENTS

| | | | |
|---|---|---|---|
| 4,864,316 | 9/1989 | Kaoru et al. | 343/704 |
| 4,879,176 | 11/1989 | Ouderkirk et al. | 428/323 |
| 4,954,797 | 9/1990 | Shinnai et al. | 343/704 |
| 5,005,020 | 4/1991 | Ogawa et al. | 343/713 |
| 5,028,292 | 7/1991 | Incremona et al. | 156/272.6 |
| 5,032,209 | 7/1991 | Shinback et al. | 156/272.6 |
| 5,083,135 | 1/1992 | Nagy et al. | 343/713 |
| 5,097,270 | 3/1992 | Lindenmeier | 343/704 |
| 5,138,330 | 8/1992 | Lindenmeier | 343/713 |
| 5,178,726 | 1/1993 | Yu et al. | 156/643 |
| 5,221,426 | 6/1993 | Tessier et al. | 156/643 |
| 5,286,550 | 2/1994 | Yu et al. | 428/212 |
| 5,363,114 | 11/1994 | Shoemaker | 343/713 |

ANTENNA ADAPTED FOR PLACEMENT IN THE WINDOW OF A VEHICLE

BACKGROUND OF THE INVENTION

This invention relates to providing a vehicle with an antenna to enable the vehicle to receive and transmit one or more electromagnetic signals.

Mast or whip antennas mounted on the exterior of a vehicle such as an automobile have been used for receiving and transmitting electromagnetic signals, e.g., radio waves. Thin film antennas designed to be affixed to a window of the vehicle, e.g., the windshield, are also known. An example of such an antenna is described in Nagy et al., U.S. Pat. No. 5,083,135.

SUMMARY OF THE INVENTION

In general, the invention features an antenna adapted for placement in the window of a vehicle that includes a flexible substrate having a pair of opposing surfaces, at least one of which is provided with a series of electrically conductive metal traces in the form of a pattern configured to receive and transmit one or more electromagnetic signals. The pitch, trace width, and thickness of the metal traces are selected such that the antenna has an area-averaged resistivity of no greater than about 1 ohm/square for a pre-determined area-averaged transmission value in the visible region. By "area-averaged" it is meant that the resistivity and transmission values represent the average values for these parameters over the entire surface area of the antenna to account for the fact that selected areas of the antenna may exhibit different values of pitch, trace width, and/or trace thickness.

In preferred embodiments, the antenna has an average resistance of no greater than about 0.5 ohm/square. Moreover, the antenna preferably has an area-averaged transmission in the visible region of at least 10%.

The metal traces are preferably made of copper metal. The antenna may also include metal traces adapted to ground the antenna (thereby eliminating the need to ground the antenna to a metallic portion of the vehicle such as the roof, space frame, or battery). To enhance environmental resistance of the antenna, the surface on which the metal traces are located may further include a primer on which at least a portion of the metal traces are located. Preferred materials for the metal traces include metal alloys (e.g., Inconel).

The antenna may further include a first colored topcoat overlying at least a portion of the metal traces. A second colored topcoat located on the opposing side of the substrate may be included as well.

The metal pattern may be configured to receive and transmit AM and FM radio signals, television signals, microwave signals (e.g., cellular telephone signals or global positioning signals), or a combination thereof. In general, the metal pattern is preferably configured in the form of a grid, with the individual grid design being selected based upon the type of signal the antenna is designed to receive and transmit, as well as requirements that may be imposed by the design of the particular vehicle itself.

The invention also features a method for enabling a vehicle having one or more windows to receive and transmit one or electromagnetic signals that includes incorporating the above-described antenna in a window of the vehicle. For example, the antenna may be incorporated in the shade band area of the windshield of the vehicle. In one preferred embodiment, the antenna is affixed to a portion of the surface of the window. In a second preferred embodiment, the antenna is incorporated within the window.

The invention provides an antenna that can be readily incorporated in the window (e.g., the windshield) of a vehicle. The antenna can thus be located close to, e.g., the vehicle's radio, thereby minimizing the need for signal amplifiers which are sometimes required if the antenna is located a distance from the radio. The antenna also eliminates drag associated with mast-type antennas, thereby improving fuel economy and wind noise.

By selecting the pitch, trace width, and thickness of individual metal traces to yield particular values of area-averaged resistivity and transmission, the invention provides an antenna in which resistivity is decoupled from transmission. Thus, it is possible to tailor the area-averaged resistivity and transmission of the antenna for a particular application. For example, it is possible to prepare an antenna that appears substantially transparent to the naked eye without compromising conductivity. Moreover, one or both sides of the antenna can be colored to match, e.g., the color of the vehicle to enhance the overall aesthetic appearance of the vehicle. By providing metal traces in the antenna for grounding the antenna, the antenna can be used in a wide variety of vehicles.

Other features and advantages of the invention will be apparent from the following description of the preferred embodiments thereof, and from the claims.

DESCRIPTION OF THE PREFERRED EMBODIMENTS

Figure 1:
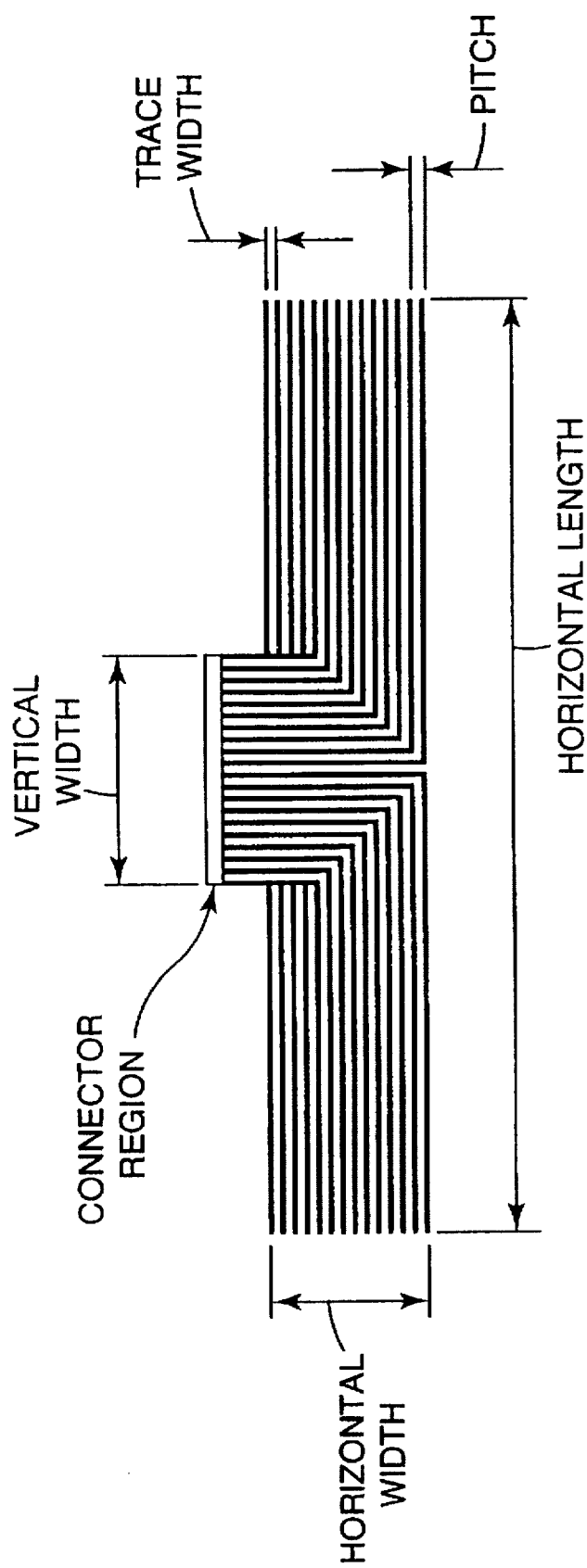
FIG. 1 is a schematic representation of a grid-like pattern of metal traces suitable for use in antennas according to the invention.

A preferred antenna according to the invention features a flexible plastic substrate provided on one or both sides with metal traces in which the metal traces form a pattern that allows the antenna to transmit and receive one or more electromagnetic signals (e.g., AM/FM radio signals, television signals, and microwave signals, including cellular telephone and global positioning signals). In the case of an antenna adapted to transmit and receive multiple signals, individual areas of the antenna may be assigned to each particular signal, and configured accordingly.

The antenna is designed to be placed in a window of a vehicle such as an automobile, van, or truck. A preferred location is the shade band area of the windshield (which may or may not be tinted). The antenna may be secured to the interior or exterior surface of the window, in which case it is preferably provided on one side with an adhesive. Examples of suitable adhesives include optically transparent adhesives such as transparent acrylic-based adhesives, polyvinyl butyral, and polyurethanes. The antenna may also be embedded within the window itself, e.g., during manufacture of the window.

The purpose of the flexible substrate is to provide a durable surface on which the delicate, metal traces can be supported. It thus facilitates both antenna manufacture and installation. It is also preferred, for aesthetic reasons, that the substrate be substantially transparent. A preferred material for the flexible substrate is a plastic such as polyethylene terephthalate. Other suitable materials include polyethylene naphthalate, polypropylene, and polyimides. The thickness of the substrate typically is in the range of about 10 to about 200 microns (more preferably about 25 to about 50 microns).

The material for the metal traces can be any electrically conductive metal or metal alloy. The primary considerations governing the selection of the metal include electrical conductivity, resistance to environmental degradation, ease of deposition and patterning, and cost. Examples of suitable metals include copper, gold, aluminum, silver, and titanium, with copper being preferred.

The metal traces are in the form of a pattern selected based upon the particular signal(s) which the antenna is designed to transmit and receive. As a person of ordinary skill will readily appreciate, the particular pattern may depend on the vehicle itself (e.g., the space frame of the vehicle), as well as the location and orientation of the antenna in the vehicle and the signal frequency. In general, however, grid-like patterns are preferred in which the metal traces form a series of parallel and/or criss-crossed lines.

The antenna may also include non-functional traces (i.e., traces that do not participate in receiving and transmitting the electromagnetic signal) for the purpose of optimizing the overall transmission characteristics of the portion of the vehicle window in which the antenna is incorporated. Furthermore, the antenna may include metal traces for grounding the antenna.

The pitch and width of individual traces are selected, along with the metal thickness, to yield an antenna having an area-averaged resistivity no greater than about 1 ohm/square (more preferably no greater than about 0.5 ohm/square) and an area-averaged transmission in the visible region (i.e., at 550 nm) that is at least 10%. The particular transmission value will depend, in part, on the area of the vehicle in which the antenna is to be incorporated. For example, antennas incorporated into the shade band area of the vehicle (or which function as the shade band itself) can tolerate lower transmission values than antennas located lower down in the window.

To provide enhanced environmental resistance, as well as enhanced adhesion, a primer layer is preferably included between the substrate and the metal traces. Suitable materials for the primer include metals, metal oxides, and metal alloys that exhibit improved oxidation resistance relative to the metal used for the metal traces. Examples include chromium, nickel, and titanium (and alloys thereof), and oxides such as chromium oxide, with Inconel (an alloy of nickel, chromium, and iron) being preferred. The thickness of the primer layer is selected such that it is as thin as possible, but still thick enough to support a bond between the substrate and the metal traces. In general, the primer thickness ranges from about 0.003 to about 0.030 micron.

One or both sides of the antenna may be colored to enhance the overall appearance of the vehicle; in the case of two-sided color, the two sides may bear the same or different colors. In addition, each individual side can be provided with more than one color. For example, the antenna can be tinted to match the exterior and/or interior of the vehicle. It can also be tinted to match the color of the shade band. Coloration is preferably achieved by using a colored ink during patterning of the antenna. To facilitate adhesion between the ink and the metal traces, a primer may be included between the metal traces and the ink.

Once incorporated in the vehicle, the metal traces of the antenna must be connected to the transmitting/receiving device of the vehicle (e.g., the radio). In addition, the transmitting/receiving device must be connected to ground (e.g., to the metal roof of the vehicle, the space frame of the vehicle, or to the vehicle's battery, or to metal traces provided on the antenna itself). In order to establish such connections, conductive tape or mechanical fasteners may be used. Alternatively, a thin film connector of the type described in Engfer et al., U.S. Pat. No. 5,426,622, hereby incorporated by reference, may be used. As described therein, such connectors feature a flexible insulator (e.g., polyethylene terephthalate) having on at least one face an electrically conductive portion (e.g., a copper or aluminum layer) and an electrically conductive adhesive (e.g., adhesives such as Creative Materials 108-10 from Creative Materials Inc. of Tyngsboro, Mass. or 3M 9703 from 3M Co. of St. Paul, Minn.) interposed between the electrically conductive portion and at least a portion of the metal traces of the antenna to establish electrical contact between the connector and the metal traces.

In general, the antenna is prepared by depositing a primer layer on the substrate surface in the form of a continuous layer, followed by deposition of a metal layer (also in the form of a continuous layer). The preferred technique for both primer and metal deposition is vacuum metallization using art-recognized processes. Prior to primer deposition, the substrate surface may be treated to enhance adhesion between the primer and substrate surface. Examples of suitable priming processes include plasma treatment, corona discharge, flame priming, and flashlamp priming (as described in Ouderkirk et al., U.S. Pat. No. 4,822,451, hereby incorporated by reference), with flashlamp priming being preferred.

Following metal deposition, a pattern of interest is printed on the metal surface using conventional ink printing equipment such as a rotary letterpress, flexography, or screen printing. Once the ink has dried or cured, both the metal and primer are removed by exposing the article to a wet etchant such as a ferric chloride solution or sulfuric acid, an ablation source such as excimer laser, flashlamp, or accelerated plasma according to the process described in Yu et al., U.S. Pat. No. 5,178,726, hereby incorporated by reference, or a combination thereof. The resulting antenna is then outfitted with a suitable connector and incorporated on or within the desired vehicle window.

The invention will now be described further byway of the following examples.

EXAMPLES

Example 1

A biaxially oriented, heat-set, polyethylene terephthalate (PET) film having a thickness of about 50 microns was flashlamp primed according to the process described in Ouderkirk et al., U.S. Pat. No. 4,822,451 to produce a film as described in Ouderkirk et al., U.S. Pat. No. 4,879,176 (hereby incorporated by reference). Next, a primer layer of Inconel was deposited on the film by vacuum metallization (thickness=0.01 micron), followed by a 0.14 micron thick layer of copper (also deposited by vacuum metallization). The resulting metallized article was then printed with an antenna pattern in the form of a grid as shown in FIG. 1 using a conventional rotary letterpress and ultraviolet-curable letterpress ink (UVOFOIL ink commercially available from Nobel). As shown in FIG. 1, the grid pattern features a series of horizontal and vertical metal traces arranged to transmit and receive AM and FM radio signals. The grid is characterized by the following parameters: vertical width, horizontal width, horizontal length, trace width (i.e., the width of an individual metal trace), and pitch (i.e., the trace to trace spacing).

Following the printing step, the copper metal between the traces of the grid was etched in a sulfuric acid/hydrogen peroxide bath, after which the article was exposed to an accelerated plasma according to the process described in Yu et al., U.S. Pat. No. 5,178,726 to remove the Inconel primer.

The plasma treatment produced an antenna having a series of 0.14 micron thick copper traces arranged in a grid characterized by a 203 micron (8 mil) pitch, 0.1 m (4 inch) vertical width, 0.89 m (35 inch) horizontal length, and 0.1 (4 inch) horizontal width. The trace width to pitch ratio was 0.5, yielding a value of 44% transmission in the visible region for the antenna (0.5 multiplied by 88%, which is the percent transmission for PET in the visible region when there are two PET/air interfaces. However, the value would be different if a material having a refractive index different from that of air were to form an interface with the PET. For example, if a PET/polyvinyl butyral interface were present, the transmission through the antenna would approach 50%

| North | 135° |
|---|---|
| Northeast | 180° |
| Northwest | 90° |
| South | 315° |
| Southeast | 270° |
| Southwest | 360° |
| East | 225° |
| West | 45° |

For each orientation, six different radio station transmitter sources were used: 89.3 MHz FM; 89.9 MHz FM; 94.5 MHz FM; 104.1 MHz FM; 770 kHz AM; and 1030 kHz AM. The measured power of the noise floor was −100 dBm for the FM band and −105 dBm for the AM band. The measured power of each radio station was taken to be the peak power associated with the center carrier frequency of the radio station. The signal (in dB) is taken to be the difference between the measured peak power of the center carrier and the measured power of the noise floor. A 1995 Ford Taurus G equipped with a mast antenna was also measured for the sake of comparison. The results are shown below in Table I.

TABLE I

| Antenna | SIGNAL STRENGTH (dB) | | | | | | | |
|---|---|---|---|---|---|---|---|---|
| | West | Northwest | North | Northeast | East | Southeast | South | Southwest |
| Example 1 | 43.5 | 50.7 | 45.0 | 54.1 | 52.7 | 50.1 | 51.6 | 35.8 |
| Mast Antenna | 36.2 | 56.6 | 61.1 | 49.5 | 56.6 | 54.3 | 55.8 | 57.8 |
| Example 1 vs. Mast Antenna | 7.3 | −5.9 | −16.1 | 4.6 | −3.9 | −4.2 | −4.2 | −22.0 | rather than 44%). The metal traces themselves had an optical density of 3.5, indicating that the traces themselves were essentially opaque, even though the overall antenna was substantially transmissive. Furthermore, the antenna exhibited a resistivity of 0.5 ohm/square after patterning and a resistivity of 0.25 ohm/square prior to patterning.

Electrical connections to the metal traces were made by soldering a short piece of wire to copper tape having a metal-filled pressure sensitive adhesive (Scotch Brand Foil Shielding Tape #1181 commercially available from 3M Co. of St. Paul, Minn.). The tape was then adhered to the connector portion of the antenna, as shown in FIG. 1.

The antenna was attached on the outside of the windshield of a 1985 Nissan Stanza sedan in the shade band area of the windshield such that the closest conducting trace of the antenna was four inches from the edge of the metal roof of the vehicle. The coaxial feed from the vehicle's radio was then connected to the wire piece described above. The coaxial shield was grounded to the metal roof of the vehicle using a direct solder connection to a 1 inch (2.54 cm) square conductive patch on the roof.

Antenna testing was conducted in an outdoor parking lot using, as a source antenna, a 100,000 watt, 1250 foot dipole antenna used by local radio stations. The power received by the car antenna from the source antenna (in decibels, dB's) was measured using a Hewlett Packard 8595E Spectrum Analyzer at a series of eight different azimuth orientations of the vehicle:

Example 2

An antenna was prepared according to the procedure of Example 1 except that the grid was characterized by an 813 micron (32 mil) pitch.

Example 3

An antenna was prepared according to the procedure of Example 1 except that the grid was characterized by a 406 micron (16 mil) pitch.

Example 4

An antenna was prepared according to the procedure of Example 3 except that the grid was characterized by a vertical width of 0.05 m (2 inch).

Examples 2–4 were tested according to the procedure of Example 1 except that the test vehicle was a 1995 Ford Taurus G and the coaxial shield was connected to the battery ground terminal of the vehicle. Averaged over each of the eight orientations, the antennas in Examples 2–4 performed −0.2 dB, −0.4 dB, and −0.8 dB, respectively, compared to the performance of the Example 1 antenna.

Example 5

A series of four samples was prepared according to the procedure of Example 1 with the following exceptions to investigate the effect of the horizontal length of the antenna:

Each of the four samples had a grid pattern characterized by a 406 micron (16 mil) pitch and 0.05 m (2 inch) vertical width. In addition, the horizontal lengths were 0.875 m (35 inch) for Sample 5a, 0.675 m (27 inch) for Sample 5b, 0.475 m (19 inch) for Sample 5c, and 0.275 m (11 inch) for Sample 5d.

Each of the four samples was tested according to the procedure of Example 1 except that the test vehicle was a 1995 Ford Taurus G and the coaxial shield was connected to the battery ground terminal of the vehicle. In addition, only one orientation (northeast) was tested. Samples 5b, 5c, and 5d performed +3.2 dB, +1.7 dB, and +3.1 dB, respectively, relative to the performance of the Sample 5a antenna.

Example 6

A series of four samples was prepared according to the procedure of Example 1 with the following exceptions:

Sample 6a was vacuum metallized with 0.075 micron copper and 0.003 micron Inconel.

Sample 6b was vacuum metallized with 0.075 nm copper and the Inconel primer layer was omitted.

Sample 6c was not flashlamp primed, and was vacuum metallized with 0.075 micron copper and 0.003 micron Inconel.

Sample 6d was not flashlamp primed, was vacuum metallized with 0.075 micron copper, and the Inconel primer layer was omitted.

Each of the four samples was printed with an antenna pattern in the form of a grid as described in Example 1, followed by exposure to an accelerated plasma to remove primer (in the case of Samples 6a and 6c) and copper metal between the traces of the grid pattern. The sulfuric acid/hydrogen peroxide wet chemical etch was omitted.

Sample 6a was tested according to the procedure used to test the antennas described in Examples 2–4. Averaged over each of the eight orientations, the antenna performance was +0.7 dB higher compared to the performance of the Example 1 antenna.

Example 7

An antenna was prepared according to the procedure of Example 1 except that the antenna had a series of copper traces arranged in a grid characterized by a 406 micron (16 mil) pitch. In addition, printing was accomplished using a multi-color rotary press. Traces on the copper metal-bearing side of the PET substrate were printed with blue ink, while the unmetallized side of the substrate was printed in registration with the metallized side using red ink.

Example 8

An antenna was prepared according to the procedure of Example 1 except that the grid was characterized by a 406 micron (16 mil) pitch. In addition, the thickness of the copper traces was 5 microns (resistivity=0.01 ohm/square). The connector region shown in FIG. 1 was split into 2 portions: a left-hand portion and a right-hand portion.

A 7.62 cm (3 inch) wire was used to electrically connect the coaxial shield from the vehicle's radio to the left-hand connector portion, thereby allowing this portion of the antenna to serve as the ground surface. The coaxial feed was connected to the right-hand connector portion.

The antenna was tested according to the procedure of Example 1 except that the test vehicle was a 1995 Ford Taurus G. In addition, only one orientation (south) was tested. The antenna's performance was −15.9 dB lower than the antenna of Example 1.

Other embodiments are within the following claims.
What is claimed is:

1. An antenna adapted for placement in the window of a vehicle, said antenna comprising a flexible substrate having a pair of opposing surfaces, at least one of which is provided with a series of electrically conductive metal traces in the form of a pattern configured to receive and transmit one or more electromagnetic signals, said metal traces having a structure characterized by a pitch, trace width, and thickness dimensioned to provide said antenna with an area-averaged resistivity of no greater than about 1 ohm/square for a predetermined area-averaged transmission value in the visible region.

2. An antenna according to claim 1 wherein said antenna has an area-averaged resistivity of no greater than about 0.5 ohm/square.

3. An antenna according to claim 1 wherein said predetermined area-averaged transmission value in the visible region is at least about 10%.

4. An antenna according to claim 1 further comprising electrically conductive metal traces for grounding said antenna.

5. An antenna according to claim 1 wherein said metal traces comprise copper traces.

6. An antenna according to claim 1 wherein at least one of said surfaces of said substrate further comprises a primer on which at least a portion of said metal traces are located.

7. An antenna according to claim 6 wherein said primer comprises a metal alloy.

8. An antenna according to claim 1 wherein said pattern comprises a grid.

9. An antenna according to claim 1 further comprising a first colored topcoat overlying at least a portion of said metal traces.

10. An antenna according to claim 9 further comprising a second colored topcoat on the opposing surface of said substrate.

11. An antenna according to claim 1 wherein said pattern is configured to receive and transmit AM and FM radio signals.

12. An antenna according to claim 1 wherein said pattern is configured to receive and transmit a television signal.

13. An antenna according to claim 1 wherein said pattern is configured to receive and transmit a microwave signal.

14. A method for enabling a vehicle having one or more windows to receive and transmit one or more electromagnetic signals comprising incorporating in a window of said vehicle an antenna comprising a flexible substrate having a pair of opposed surfaces on at least one of which is provided electrically conductive metal traces in the form of a pattern configured to receive and transmit one or more electromagnetic signals, said metal traces having a structure characterized by a pitch, trace width, and thickness dimensioned to provide said antenna with an area-averaged resistivity of no greater than about 1 ohm/square for a predetermined area-averaged transmission value in the visible region.

15. A method according to claim 14 comprising affixing said antenna to a portion of the surface of said window.

16. A method according to claim 14 comprising incorporating said antenna within said window.

17. A method according to claim 14 wherein said vehicle comprises a windshield having a shade band area, said method comprising incorporating said antenna in said shade band area of said windshield.

* * * * *